(12) United States Patent
Schmidt

(10) Patent No.: US 9,706,789 B2
(45) Date of Patent: Jul. 18, 2017

(54) USE OF NITROGEN-CONTAINING COMPOUNDS AS PLASTICIZERS FOR PEPTIDE-BASED BIOPOLYMERS AND USES THEREOF

(71) Applicant: The United States of America, as represented by the Secretary of Agriculture, Washington, DC (US)

(72) Inventor: Walter F Schmidt, Glenn Dale, MD (US)

(73) Assignee: The United States of America, as represented by The Secretary of Agriculture, Washington, DC (US)

(*) Notice: Subject to any disclaimer, the term of this patent is extended or adjusted under 35 U.S.C. 154(b) by 0 days.

(21) Appl. No.: 14/610,661

(22) Filed: Jan. 30, 2015

(65) Prior Publication Data
US 2016/0219903 A1 Aug. 4, 2016

(51) Int. Cl.
| | | |
|---|---|---|
| *A23K 1/00* | (2006.01) | |
| *A23K 1/16* | (2006.01) | |
| *C08L 89/00* | (2006.01) | |
| *C05F 1/00* | (2006.01) | |
| *A23K 1/18* | (2006.01) | |

(Continued)

(52) U.S. Cl.
CPC .............. *A23K 1/1634* (2013.01); *A23K 1/18* (2013.01); *A23K 1/182* (2013.01); *A23K 1/188* (2013.01); *A23K 10/26* (2016.05); *A23K 20/142* (2016.05); *A23K 50/10* (2016.05); *A23K 50/15* (2016.05); *A23K 50/80* (2016.05); *C05F 1/005* (2013.01); *C08L 89/00* (2013.01); *Y02P 20/145* (2015.11)

(58) Field of Classification Search
CPC ...... A23K 1/1634; A23K 1/182; A23K 1/188; A23K 1/18; C08L 89/00; C05F 1/005
See application file for complete search history.

(56) References Cited

U.S. PATENT DOCUMENTS 3,692,530 A * 9/1972 Graham ................. A23K 1/146
127/37
5,643,622 A * 7/1997 Sawhill .................. A23C 21/02
426/41

(Continued)

OTHER PUBLICATIONS

Apelo, Arriola S. I. et al., "Invited Review: Current representation and future trends of predicting amino acid utilization in the lactating dairy cow", (2014) Journal of Dairy Science, 97:1-18.

(Continued)

*Primary Examiner* — Jennifer A Smith
(74) *Attorney, Agent, or Firm* — John D. Fado; Ariel A. Atkinson

(57) ABSTRACT

A novel method of reducing the melting point of a peptide-based biopolymer using a nitrogen-containing compound as a plasticizer is provided. The peptide-based biopolymer can be keratin or silk. The nitrogen-containing compound can be one or more amino acids or other nitrogen-containing compounds (except urea), all of which have a melting temperature above approximately 133° C., the decomposition temperature of urea. Pellets made using this novel process can be used as animal feed and soil amendments (fertilizer) to increase the adsorption of amino acids in the animal or in the soil, respectively.

16 Claims, 10 Drawing Sheets
(9 of 10 Drawing Sheet(s) Filed in Color)

(51) Int. Cl.
A23K 10/26 (2016.01)
A23K 20/142 (2016.01)
A23K 50/10 (2016.01)
A23K 50/80 (2016.01)
A23K 50/15 (2016.01)

(56) References Cited

U.S. PATENT DOCUMENTS

| | | |
|---|---|---|
| 5,705,030 A | 1/1998 | Gassner, III et al. |
| 5,720,970 A | 2/1998 | Rode et al. |
| 5,795,585 A | 8/1998 | Ikeda et al. |
| 5,871,773 A | 2/1999 | Rode et al. |
| 7,066,995 B1 | 6/2006 | Barone et al. |
| 7,645,471 B2 | 1/2010 | Harris et al. |
| 2014/0060383 A1 | 3/2014 | Wu et al. |

OTHER PUBLICATIONS

Bredwell, Paul, "Feather meal a quality source of protein for dairy cattle", (2012) Progressive Dairyman, pp. 1-4.

Lee, C. et al., "Rumen-protected lysine, methionine, and histidine increase milk protein yield in dairy cows fed a metabolizable protein-deficient diet", (2012) Journal of Dairy Science 95:6042-6056.

Paz, H.A. et al., "Evaluation of rumen-protected lysine supplementation to lactating dairy cows consuming increasing amounts of distillers dried grains with solubles" (2013) Journal of Dairy Science 96:7210-7222.

* cited by examiner

USE OF NITROGEN-CONTAINING COMPOUNDS AS PLASTICIZERS FOR PEPTIDE-BASED BIOPOLYMERS AND USES THEREOF

BACKGROUND OF THE INVENTION

Field of Invention

This invention relates to the novel use of nitrogen-containing compounds having a melting point greater than the melting point of urea and the use of these compounds as plasticizers for peptide-based biopolymers. The peptide-based biopolymers with the nitrogen-containing plasticizer can be used as fertilizer, animal feed, and a substitute for hydrocarbon-based plastics.

Description of the Prior Art

In polymer chemistry, plasticizers are added to ease compounding and processing procedures and are used to produce the desired product properties. In some instances, the addition of a plasticizer to a material results in a lowering melting point of the plasticizer/material combination compared to the melting point for both the plasticizer and the material, individually. For example, outside of polymer technology, tin has a melting point of 231° C. and lead has a melting point of 327° C.; yet a Sn—Pb mixture (such as a solder) melts at approximately 182-183° C.

Peptide-based biopolymers, such as keratin and silk, have limited utility as biopolymers because of the difficulty of working with them as a biopolymer. Many peptide-based biopolymers are cross-linked via disulfide bonds between the cysteines within the biopolymer's amino acids. These disulfide bonds impart strength and rigidity to the biopolymers. However, to use these biopolymers, one must often break the disulfide bonds using high temperature, acids, alkalines, redox agents, enzymes, urea, or a combination thereof. Yet such treatments can also break the peptide bonds between the amino acids resulting in the peptide-based biopolymer becoming too soft or decomposing. In addition to disulfide bonds, the secondary structure of peptide-based biopolymers can include large amounts of α-helix and/or β-sheet formations which also strengthen the peptide-based biopolymer because of hydrogen bonding between the amide and carbonyl groups of different amino acids within the helix or between different strands of the sheet. Breaking these hydrogen bonds without decomposing the biopolymer can be difficult.

While urea is extremely useful in degrading disulfide bonds, under normal processing conditions, urea breaks down into ammonia, a toxic substance under certain conditions. As such, OSHA requires (i) isolating every extruder containing urea and biopolymers from other equipment in the facility, and (ii) workers must wear protective breathing gear while operating extruders containing urea and biopolymers. Additionally, ammonia corrodes expensive metal molds. Finally, ammonia sublimates under biopolymer processing conditions; thus resulting in ammonia bubble formation in the pellets which then can pop like popcorn during the extrusion process. As such, urea is a sub-optimal plasticizer for peptide-based biopolymers.

Hydrocarbon-based polymers have previously been used as plasticizers for peptide-based biopolymers. However, using hydrocarbon-based polymers as a plasticizer defeats the goals of using biodegradable chemicals and using chemicals that are not made from petroleum, a scarce commodity. U.S. Pat. No. 7,006,995 describes using ethylene glycol (($CH_2OH)_2$), propylene glycol ($CH_3OHCHOHCH_2OH$), glycerol (($CH_2OH)_2CHOH$), sorbitol (($CH_2OH)_2(CHOH)_4$), and vinyl alcohols (($HCOHCH_2)_n$) as plasticizers for keratin, a peptide-based biopolymer. Yet, these plasticizers are not nitrogen-containing plasticizers of the present invention and, in general, are not ideal. Because of the thermal stress that occurs during extrusion to form keratin composites, polyols can lose a water molecule. Glycerol, for example, can lose a water molecule, causing formation of glycidol, a thermally unstable and therefore chemically reactive compound. This will result in unwanted side reactions with sites in the biopolymer substrate. Glycidol is a potential carcinogen, and is volatile, especially above its boiling point of 167° C. Thus, any glycidol formed that remains unreacted during extrusion could be released into the air upon leaving the extruder. Also, some glycerol can leach out of biopolymer formulations causing the biopolymer to have a greasy feeling when touched/handled.

It is well-established that lactating dairy cows often have amino acid deficiencies, especially lysine which is present in high concentration in milk. Feeding rumen-protected lysine, methionine, and histidine to dairy cows result in increased milk protein yield. (Lee, et al., *J. Dairy Sci.* 95:6042-6056 (2012)) The prior art is full of attempts to increase the amount of amino acids available to cows to increase their absorption of the amino acids.

U.S. Pat. No. 5,720,970 discloses a feed additive containing lysine and/or methionine covered in a protective coating of lecithin, at least one inorganic substance which is stable in neutral pH conditions and soluble under acidic conditions, and either $C_{14}$-$C_{22}$ monocarboxylic acids, hardened vegetable oils, hardened animal oils, and/or waxes. The goal of this feed additive is to allow the lysine and/or methionine to pass through the rumen undigested and then release the lysine and/or methionine in an environment conducive for absorption of the amino acids. U.S. Pat. Nos. 5,720,970 and 5,871,773 also disclose that one should introduce the amino acid feed additive at specific times related to milk production (i.e., for a specific period of time prior to calving and for a specific period of time during lactation). U.S. Pat. No. 5,795,585 discloses a feed additive containing a phosphoric acid salt of a basic amino acid and magnesium, and optionally another polyvalent metal ion. The basic amino acid can be lysine, arginine and ornithine. This feed additive is stable in the rumen and releases the basic amino acids in the abomasum and other lower digestive organs of a ruminant. Yet, these prior art methods of increasing amino acid absorption in the ruminant do not work well, and a need still exists for a method to increase amino acid absorption in ruminants as well as the compositions that are used to increase amino acid absorption.

As such, a need exists for an easy-to-use plasticizer (such as nitrogen-containing compounds having a melting point higher than urea) that can be used with peptide-based biopolymers to make compounds such as fertilizers and animal feed; and lack the problems of using petroleum-based plasticizers or urea.

BRIEF DESCRIPTION OF THE FIGURES

The patent or application file contains at least one drawing executed in color. Copies of this patent or patent application publication with color drawing(s) will be provided by the Office upon request and payment of the necessary fee.

BRIEF DESCRIPTION OF THE INVENTION

Figure 1:
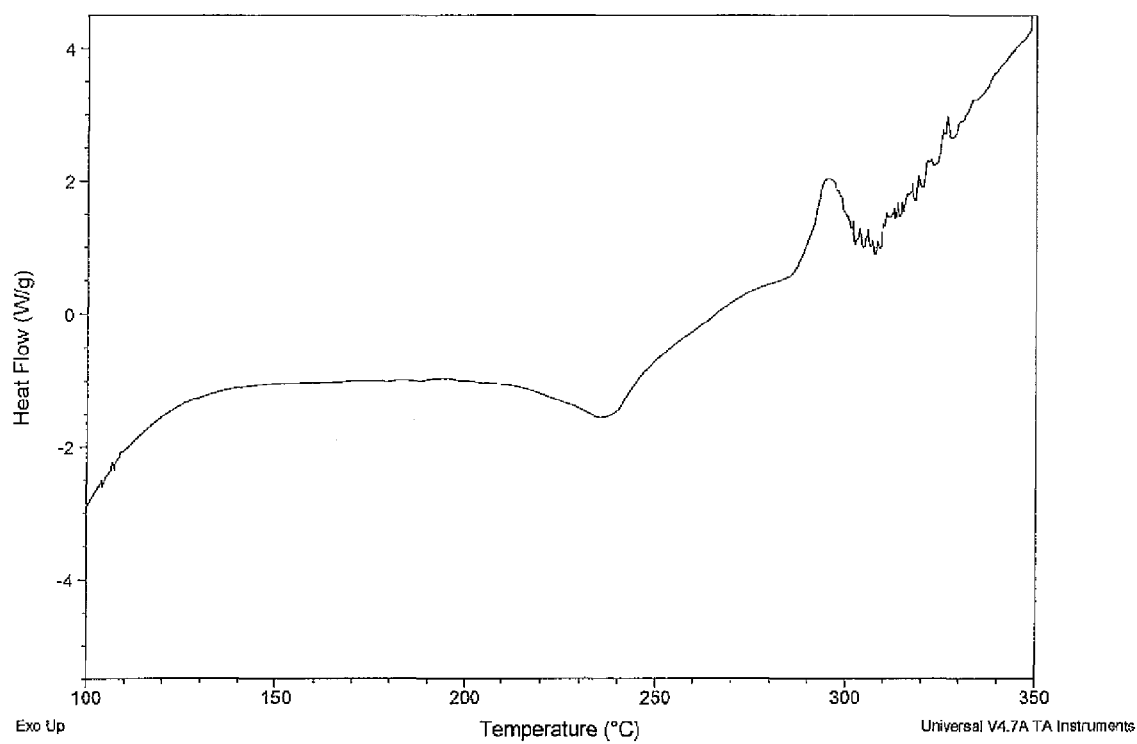
FIG. 1 shows the differential scanning calorimetry analysis of feather keratin.

It is an object of this invention to have a method for processing a peptide-based biopolymer by mixing the peptide-based biopolymer with a nitrogen-containing compound which has a melting point greater than the melting point of urea. It is further object of this invention that the peptide-based biopolymer is keratin or silk. It is another object of this invention that the nitrogen-containing compound can be an amino acid, biuret, melamine or a combination thereof. It is a further object of this invention that the ratio of the weight of the peptide-based biopolymer to the weight of the nitrogen-containing compound ranges from approximately 1%/99% to approximately 15%/85%. It is another object of this invention that the ratio of the weight of the peptide-based biopolymer to the weight of the nitrogen-containing compound is approximately 10%/90%. In another objective of this invention, the mixture of the peptide-based biopolymer and the nitrogen-containing compound are heated.

It is an object of this invention to have a method for processing a peptide-based biopolymer, keratin, by mixing keratin with a nitrogen-containing compound where the nitrogen-containing compound can be proline, lysine, serine, glycine, biuret, melamine, or combinations thereof. It is a further object of this invention that the ratio of the weight of the keratin to the weight of the nitrogen-containing compound ranges from approximately 1%/99% to approximately 15%/85%. It is another object of this invention that the ratio of the weight of the keratin to the weight of the nitrogen-containing compound is approximately 10%/90%. In another objective of this invention, the mixture of the keratin and the nitrogen-containing compound are heated.

It is another object of this invention to have a method for producing an extrusion pellet which contains a peptide-based biopolymer and a nitrogen-containing compound, the method having the steps of combining the peptide-based biopolymer with the nitrogen-containing compound to form a mixture, heating the mixture to a temperature between approximately 130° C. and less than 300° C., and forming the melted mixture into a pellet, so long as the nitrogen-containing compound is not urea. In one embodiment, the temperature used to heat the mixture is between approximately 130° C. and approximately 295° C.

It is another object of this invention to have a method for producing an extrusion pellet which contains a peptide-based biopolymer and a nitrogen-containing compound by combining the peptide-based biopolymer with the nitrogen-containing compound to form a mixture, heating the mixture to a temperature between approximately 130° C. and less than 300° C., and forming the melted mixture into a pellet, so long as the nitrogen-containing compound is not urea. It is a further object of this invention that the peptide-based biopolymer can be keratin or silk or both. It is another object of this invention that the nitrogen-containing compound can be an amino acid, biuret, melamine or a combination thereof. It is a further object of this invention that the ratio of the weight of the peptide-based biopolymer to the weight of the nitrogen-containing compound ranges from approximately 1%/99% to approximately 15%/85%. It is another object of this invention that the ratio of the weight of the peptide-based biopolymer to the weight of the nitrogen-containing compound is approximately 10%/90%. It is another object of this invention that when the peptide-based biopolymer is keratin, the nitrogen-containing compound is biuret, melamine, proline, lysine, glycine, serine, or a combination thereof. In another object of the invention, the melting point of the nitrogen-containing compounds is greater than 132° C.

It is an object of this invention to have an extrusion pellet containing a peptide-based biopolymer and a nitrogen-containing compound that is made by combining the peptide-based biopolymer with the nitrogen-containing compound to form a mixture, heating the mixture to a temperature between approximately 130° C. and less than 300° C., and forming the melted mixture into a pellet, so long as the nitrogen-containing compound is not urea. It is a further object of this invention that the peptide-based biopolymer can be keratin or silk or both. It is another object of this invention that the nitrogen-containing compound can be an amino acid, biuret, melamine or a combination thereof. It is a further object of this invention that the ratio of the weight of the peptide-based biopolymer to the weight of the nitrogen-containing compound ranges from approximately 1%/99% to approximately 15%/85%. It is another object of this invention that the ratio of the weight of the peptide-based biopolymer to the weight of the nitrogen-containing compound is approximately 10%/90%. It is another object of this invention that when the peptide-based biopolymer is keratin, the nitrogen-containing compound is biuret, melamine, proline, lysine, glycine, serine, or a combination thereof. In another object of the invention, the melting point of the nitrogen-containing compounds is greater than 132° C.

It is a further object of this invention to have an animal feed pellet that contains a mixture of a peptide-based biopolymer and a plasticizer and optionally amino acids, vitamins and/or minerals that are nutritionally important to the animal that will be fed the animal feed pellet, such that the plasticizer contains at least one nitrogen atom and has a melting point greater than the melting point of urea, and such that the peptide-based biopolymer and plasticizer are mixed together with or without the optionally amino acids, vitamins, and/or minerals, heated and formed into the animal feed pellet. It is another object of this invention that when the plasticizer is not lysine, lysine is included in the mixture as a nutritionally important amino acid for the animal that will be fed the animal feed pellet. It is another object of this invention that peptide-based biopolymer can be silk or keratin, but when it is keratin, then the plasticizer can be lysine, proline, glycine, biuret, serine melamine or a combination thereof. It is a further object of this invention that the ratio of the weight of the peptide-based biopolymer to the weight of the plasticizer ranges from approximately 1%/99% to approximately 15%/85%. It is another object of this invention that the ratio of the weight of the peptide-based biopolymer to the weight of the plasticizer is approximately 10%/90%.

Another object of this invention is to have a method of increasing the absorption of amino acids in the digestive tract of an animal by feeding the animal the animal feed pellet that contains a peptide-based biopolymer and a plasticizer that contains at least one nitrogen atom and the plasticizer has a melting point greater than the melting point of urea. The animal feed pellet can optionally also contain other amino acids, vitamins, and minerals that are nutritionally important to the animal which is fed the animal-feed pellet. It is a further object of this invention that the ratio of the weight of the peptide-based biopolymer to the weight of the plasticizer ranges from approximately 1%/99% to approximately 15%/85%. It is another object of this invention that the ratio of the weight of the peptide-based biopolymer to the weight of the plasticizer is approximately 10%/90%. It is another object of this invention that peptide-based biopolymer can be silk or keratin, but when it is keratin, then the plasticizer can be lysine, proline, glycine, biuret, serine melamine or a combination thereof. It is another object of this invention that the animal can be a mammal, bird, or fish. In another objective of this invention, the mixture of the peptide-based biopolymer, the nitrogen-containing compound, and the optional amino acids, vitamins, and minerals are heated and shaped into a pellet.

It is an object of this invention to have an animal feed additive that contains a mixture of a peptide-based biopolymer and a nitrogen-containing compound such that the nitrogen-containing compound is not urea and has a melting temperature higher than 133° C., and that the mixture of the peptide-containing biopolymer and the nitrogen-containing compound are heated together to a temperature less than 300° C. and formed into pellets that can be added to an animal's feed. It is another object of this invention that peptide-based biopolymer can be silk or keratin, but when it is keratin, then the nitrogen-containing compound can be lysine, proline, glycine, biuret, serine melamine or a combination thereof. It is a further object of this invention that the animal feed additive can optionally contain minerals, vitamins, and/or amino acids that are nutritionally valuable to the animal that will receive the animal feed additive. It is a further object of this invention that the ratio of the weight of the peptide-based biopolymer to the weight of the nitrogen-containing compound ranges from approximately 1%/99% to approximately 15%/85%. It is another object of this invention that the ratio of the weight of the peptide-based biopolymer to the weight of the nitrogen-containing compound is approximately 10%/90%.

It is an object of this invention to have a fertilizer pellet that contains a mixture of a peptide-based biopolymer and a nitrogen-containing compound such that the nitrogen-containing compound is not urea and has a melting temperature higher than 133° C., and that the mixture of the peptide-containing biopolymer and the nitrogen-containing compound are heated together to a temperature less than 300° C. and formed into the fertilizer pellets. It is another object of this invention that peptide-based biopolymer can be silk or keratin, but when it is keratin, then the nitrogen-containing compound can be lysine, proline, glycine, biuret, serine melamine or a combination thereof. It is a further object of this invention that the fertilizer pellet can optionally contain minerals, vitamins, and/or amino acids that are nutritionally valuable to the plants that will receive the fertilizer pellets and important for the plants' growth. It is a further object of this invention that the ratio of the weight of the peptide-based biopolymer to the weight of the nitrogen-containing compound ranges from approximately 1%/99% to approximately 15%/85%. It is another object of this invention that the ratio of the weight of the peptide-based biopolymer to the weight of the nitrogen-containing compound is approximately 10%/90%.

DETAILED DESCRIPTION OF THE INVENTION

Peptide-based biopolymers have a variety of useful functions, such as fertilizers, animal feed, and substitutes for petroleum-based plastics, to name a few. However, until now, it has been difficult to process the peptide-based biopolymers in a low-cost manner and obtain a compound that has the desired malleability, strength, digestibility, and biodegradation half-life. The present process of producing peptide-based biopolymers that have the desired properties is novel. In short, it involves using nitrogen-containing compounds as plasticizers for the peptide-based biopolymers. The novel compositions of nitrogen-containing plasticizers and the peptide-based biopolymers can be used as fertilizers, animal feed, and as substitutes for petroleum-based plastics.

Peptide-based biopolymers can include, but are not limited to, keratin and silk. Keratin can be obtained from animal wool, hair, nail, epidermis, hooves, horns, and feathers (both fibers and quill). Silk can be obtained from caterpillars and spiders.

The plasticizers of this invention are nitrogen-containing compounds. In one embodiment, these nitrogen-containing compounds are any compound which contain nitrogen and have a melting point greater than the melting point of urea (approximately 133° C.). Non-limiting examples of the nitrogen-containing compounds of this invention (and the compound's melting point) are biuret (193° C.), melamine (345° C.), lysine (215° C.), glycine (223° C.), proline (228° C.), hydroxyproline (274° C.), threonine (255-257° C.), alanine (297° C.), serine (222° C.), and methionine (281° C.). In another embodiment, the nitrogen-containing compounds of this invention also include valine (298° C.), leucine (293-295° C.), isoleucine (284° C.), cysteine and cystine (260-261° C.), phenylalanine (270-275° C.), tyrosine (316° C.), tryptophan (228° C.), aspartic acid (270-271° C.), glutamic acid (247-249° C.), arginine (244° C.), and histadine (254° C.). One can use one or more of the nitrogen-containing compounds as a plasticizer for peptide-based biopolymers. The nitrogen-containing compounds can be in the form of (i) an individual nitrogen-containing compound; or (ii) dimers, trimers, or larger number of a particular nitrogen-containing compound that are linked together (e.g., a dipeptides, tripeptides, or longer peptides of a particular amino acid); or (iii) dimers, trimers, or longer number of two or more nitrogen-containing compounds that are linked together (e.g., dipeptides, tripeptides, etc., containing two or more amino acids); or (iv) a mixture of two or more different nitrogen-containing compounds. In one embodiment, five is the upper size limit for a string of nitrogen-containing compounds linked together. In another embodiment, seven is the upper size limit. In yet another embodiment, ten is the upper size limit for the string of nitrogen-containing compounds linked together. Another embodiment has a maximum of fifteen units of nitrogen-containing compounds linked together. In one embodiment, one can use only the L enantiomers of the nitrogen-containing compounds. In another embodiment, one can use only the R enantiomer of the nitrogen-containing compounds. In a third embodiment, one can use a racemic mixture. Unless noted otherwise, the L enatiomer of the nitrogen-containing compound is used in the examples.

Not wishing to be bound to any particular hypothesis, these peptide-based biopolymers and nitrogen-containing compounds (the plasticizers) are structurally similar. It is hypothesized that the best plasticizer to use for a particular peptide-based biopolymer is one or more nitrogen-containing compounds that resemble, structurally and/or chemically, at least a portion of the peptide-based biopolymer. In this manner, the plasticizer and the peptide-based biopolymer absorb thermal energy similarly, and, it is hypothesized, that the plasticizer(s) can better transfer its thermal kinetic energy to the similar parts of the peptide-based biopolymer, thereby better disrupting the secondary and tertiary structure of the peptide-based biopolymer. If the structures of the plasticizer(s) and the peptide-based biopolymer are similar, yet one of them (usually the plasticizer) is more flexible than the other (usually the peptide-based biopolymer), the more flexible compound will soften the more rigid compound over a uniform temperature increase or gradient. Thus, when a particular region(s) and/or site(s) of a peptide-based biopolymer are rigid, using a plasticizer that mimics, structurally and/or chemically, the rigid region(s) and/or site(s) of the peptide-based biopolymer causes the entire peptide-based biopolymer to become markedly less rigid and better suited for processing (i.e., undergo extrusion molding or injection molding).

The three most abundant amino acids in feather keratin are serine, proline, and glycine. As such, for feather keratin, plasticizers containing serine, proline, and glycine, as well as lysine, and the non-amino acid compounds biuret, melamine, or a combination of any of the above, work well with feather keratin.

Silk contains two proteins, sericin and fibroin, as its primary components. The three most abundant amino acids in fibroin are glycine, serine, and alanine. The three most abundant amino acids in sericin are serine, aspartic acid, and glycine. For silk, plasticizers containing glycine, serine, alanine, valine, threonine, proline, aspartic acid, or a combination thereof, work well as plasticizers with silk.

For the peptide-based biopolymers used in this invention, the nitrogen-containing plasticizer should have a melting point greater than the melting point of urea. The plasticizer should contain at least one nitrogen atom. In another embodiment, the plasticizer can be one or more amino acids, biuret, or melamine.

In the mixtures of nitrogen-containing compounds and peptide-based biopolymers, the amount of the nitrogen-containing compounds can range from approximately 1% to approximately 99% by weight while the amount of peptide-based biopolymer can range from approximately 99% to approximately 1% by weight in one embodiment. In another embodiment, the amount of nitrogen-containing compounds can range from approximately 25% to approximately 99% by weight and the amount of peptide-based biopolymer can range from approximately 75% to approximately 1% by weight. In another embodiment, the amount of nitrogen-containing compounds can range from approximately 50% to approximately 99% by weight and the amount of peptide-based biopolymer can range from approximately 50% to approximately 1% by weight. Alternatively, the amount of nitrogen-containing compounds can range from approximately 85% to approximately 99% by weight and the amount of peptide-based biopolymer can range from approximately 15% to approximately 1% by weight. Still yet, in one embodiment, the amount of nitrogen-containing compounds can be approximately 10% by weight, while the amount of peptide-based biopolymer can be approximately 90%. Of course, if other compounds (e.g., nutritionally important amino acids, minerals, and/or vitamins) are added to the mixture and formed into pellets with the peptide-containing biopolymer and nitrogen-containing plasticizer, then the ratio of the weight of the biopolymer to the weight of the plasticizer within the pellet can remain the same as those provided above.

One can mix the plasticizer (nitrogen-containing compound(s)) with the peptide-based biopolymer according the above indicated ratios, and then heat the mixture to the phase transition temperature (also referred to as the melting temperature or $T_m$) for that particular mixture. The phase transition temperature for each individual mixture is that temperature at which the mixture becomes malleable. This temperature can depend on (i) the type of nitrogen-containing compound plasticizer used, (ii) the type of peptide-based biopolymer used, and (iii) the ratio of the amount of nitrogen-containing compound plasticizer to the amount of peptide-based biopolymer in the mixture. This melting temperature can be determined empirically for each mixture of plasticizer and peptide-based biopolymer using differential scanning calorimetry (DSC) or other well-known in the art field assays. When the melting temperature of the mixture is achieved, the peptide-based biopolymer becomes malleable.

While heating the mixture (or shortly after heating the mixture), one can use an extruder (a single-screw extruder or twin-screw extruder) to make pellets or other shapes of the mixture. In one embodiment, the mixture of peptide-based biopolymer and nitrogen-containing compound plasticizer are added to an extruder, heated, and then formed into pellets. The size and shape of the pellets may vary. For example, the pellets may be a sphere, hemi-sphere, cube, cuboid, cylinder, tetrahedron, cone, octahedron, prism, pyramid, or dodecahedron, to name a few possible shapes. Non-limiting range of sizes for the pellets are approximately 1 mm to approximately 200 mm in length, approximately 1 mm to approximately 100 mm in height, and/or approximately 1 mm to approximately 100 mm in width or diameter. In one embodiment, the pellets range from approximately 1 mm to approximately 3 mm in length, and approximately 1 mm to approximately 3 mm in diameter. The pellets could be uniform in shape, or the shapes could vary.

The temperature ranges in the extruder regions and screw velocity are adjusted as needed to maximize interfacial interaction of the plasticizer fraction and the peptide-based biopolymer. One uses DSC, Raman spectroscopy, and/or temperature-dependent Raman spectroscopy (TDR) to empirically determine the optimal temperature range for each peptide-based biopolymer and plasticizer mixture. Different screw designs could be required with different plasticizers because the rate of effective interfacial mixing between plasticizer and peptide-based biopolymer also can be time, as well as temperature, dependent. Screw design to optimize mixing time in the extruder barrel can be optimized by one of ordinary skill in the art.

For any formulation, flow-through extruders actually will completely stop if the composition in the extruder is too liquid-like, and also if the composition is too solid-like/rigid. Thus, one needs a nitrogen-containing compound plasticizer with rigid solids. Thermal stress will routinely cause peptide-containing biomolecules to decompose at molecular sites too rigid to allow extrusion to take place. Nitrogen-containing compounds (plasticizers) that soften at different temperatures (and which have chemical affinity for a substrate) lower the temperature at which a substrate will flow under pressure, enabling extrusion to occur. In one embodiment, it may be preferable to use the lowest temperature and lowest amount of nitrogen-containing compound plasticizer that will allow the peptide-based biopolymer substrate to extrude. This temperature is the lowest temperature that results in the softening of the peptide-based biopolymer, as determined by one of the spectroscopy assays mentioned above.

Substrates have a large range of melting temperatures, and concurrently, peptide-based biopolymers have a large range of potential binding sites. Specific binding sites, for example, can keep the substrate rigid. Only structures which disrupt the rigid sites in the peptide-based biopolymer will significantly affect its macroscopic physical properties as observed in a DSC curve. Nitrogen-containing compounds plasticizers (described herein) have a wide range of melting/softening temperatures, and different specific rigid binding could be more or less tightly rigid, i.e. soften at different temperatures. The value of this invention is that a peptide-based biopolymer substrate and one or more nitrogen-containing compound plasticizers can be matched with the temperature range at which the peptide-based biopolymer can be extruded.

These pellets or other shapes can then be used after cooling for a variety of uses, including as a fertilizer or animal feed.

A variety of animals do not ingest or absorb sufficient amounts of particular amino acids. For example, lactating dairy cows often have amino acid deficiencies, especially lysine which is present in high concentration in milk. Feeding rumen-protected lysine, methionine, and histidine to dairy cows result in increased milk protein yield. See, Lee, et al. (2012).

Currently aquaculture feeds (also referred to as "aquafeed"), especially those for carnivorous species, heavily depend on fish meal to meet their critical protein requirements. The global supply of fish meal has remained static and will likely decline in the future, because captured fisheries have reached maximum sustainable yields while world aquaculture production expands. Thus, a need for an alternative source of protein for aquaculture feed exists. Aquafeed includes feed for any fish, such as, but not limited to fish located in fish farms (fresh and salt water), hobby fish (i.e., in aquariums, ponds, etc.), and fish at commercial aquariums or tourist attractions. Aquafeed formulations should remain solid until consumed; nutrients which dissolve and/or are released too quickly into the water can no longer be eaten by the fish and concurrently contaminate the water in which the fish live. Peptide-based biopolymers are a promising source of protein for aquafeed because of high availability (especially keratin) and high protein content and because nutrients are not released into the water (i.e., the animal feed pellets stay solid nor do nutrients dissolve out of the animal feed pellets).

When manufacturing the animal feed pellets of nitrogen-containing compound plasticizer, peptide-based biopolymer mixture, one can add other amino acids, vitamins, and/or minerals to the mixture prior to producing the pellets. These other amino acids, vitamins, and/or minerals should be nutritionally important to the animals which will be fed the pellets. Thus, one can increase the nutritional value of the animal feed pellets by the addition of amino acids, vitamins and/or minerals (or combinations thereof) to the nitrogen-containing compound plasticizer, peptide-based biopolymer mixture. As discussed previously, lysine alone or in combination with methionine and histidine, can improve the milk protein yield in dairy cows when the amino acids are protected from digestion in the cow's rumen (Lee, et al. (2012)). Further certain minerals also improve dairy cattle's milk production efficiency (U.S. Pat. No. 5,795,585). Thus, an animal feed pellet containing the nitrogen-containing compound plasticizer, peptide-based biopolymer mixture and other components such as one or more amino acids, minerals, and/or vitamins can be useful to improve the health of an animal and/or conversion ratio of feed to milk or muscle.

Animal feed pellets of the nitrogen-containing compound plasticizer, peptide-based biopolymer mixture can be fed to fish, birds, amphibians, reptiles, and mammals. Thus, the pellets made using the processes described herein can be food for a variety of animals. Non-limiting examples of mammals are ruminants, swine, dogs, cats, horses, goats, deer, sheep, camels, etc. Non-limiting examples of fish include salmon, catfish, trout, tropical fish (hobby), tuna, flounder, etc. Birds, including but not limited to chickens, turkeys, quail, ducks, and other domesticated birds, may be fed the pellets made from the nitrogen-containing compound plasticizer, peptide-based biopolymer mixture described herein. Shrimp, lobsters, crabs, turtles, frogs, toads, salamanders, newts, and other animals may also feed on pellets made from the nitrogen-containing compound plasticizer, peptide-based biopolymer mixture described herein.

In addition, the pellets made using the processes described herein from the nitrogen-containing compound plasticizer, peptide-based biopolymer mixture can be used as fertilizer, being placed in the soil to allow the microorganisms in the soil to release of amino acids which react further by microbial processes forming nitrate, or ammonia in the soil. When used in such fashion, the pellet is referred to as a fertilizer pellet.

To illustrate the invention and the manner of practicing the same more fully, the following examples are presented. Without being limited thereto, modifications will be obvious to those skilled in the art. For convenience, the examples will use keratin, however one of ordinary skill in the art will recognize how can use other peptide-based biopolymers in the methods of this invention.

EXAMPLE 1

Assessment of Different Plasticizers for Keratin

Extrusion of a polymer requires a viscous flow of that polymer. Successful processing conditions require a temperature sufficient for the solid polymer to soften; however, excess thermal energy (or too much heat) results in thermal degradation of the polymer. Peptide-based biopolymers are not different. In one embodiment, one maintains extrusion temperatures below the thermal decomposition temperature of the peptide-based biopolymer to be extruded. For keratin the extrusion temperature should be below 300° C. Thus, a good nitrogen-containing compound plasticizer permits the extrusion temperature of the mixture of keratin and the plasticizer to remain below 300° C.

Thermal analysis, specifically differential scanning calorimetry (DSC), is routinely used to evaluate the processing temperature of peptide-based biopolymers and also the effectiveness of a plasticizer in lowering the processing temperature of peptide-based biopolymers. The two different forms of poultry feather keratin (feather quill and feather fiber) absorb thermal energy at different temperature: the quill (which are β-sheets of keratin) melts at 200° C.; and the fiber (which are α-helix of keratin) melts at 215° C.

FIG. 1 shows the heat flow curve measured by DSC (Model Q200 TA, Instruments-Waters LLC, New Castle, Del.) for 1-2 mg sample of pure feather keratin (containing 50% feather quill and 50% feather fiber particles wt/wt). Prior to performing the DSC analysis the keratin is powdered in a ball mill (Retsch, Model PM400, Haan, Germany) to about 100 nm. The heat flow inflection point for feather keratin (FIG. 1, Point A) indicates that feather keratin starts to absorb heat energy at approximately 220° C. However, the plot of feather keratin does not have a steep curve at its heat flow peak at approximately 240° C. nor is the overall range of heat flow (y-axis) very large, thus indicating that very little softening of feather keratin occurs between approximately 220° C. and approximately 250° C. The heat flow measurements using DSC indicate that extrusion of feather keratin is difficult and that feather keratin will decompose before it extrudes easily. It is noted that in FIG. 2 the plot after 270° C. is machine noise, an artifact of the assay.

Figure 2:
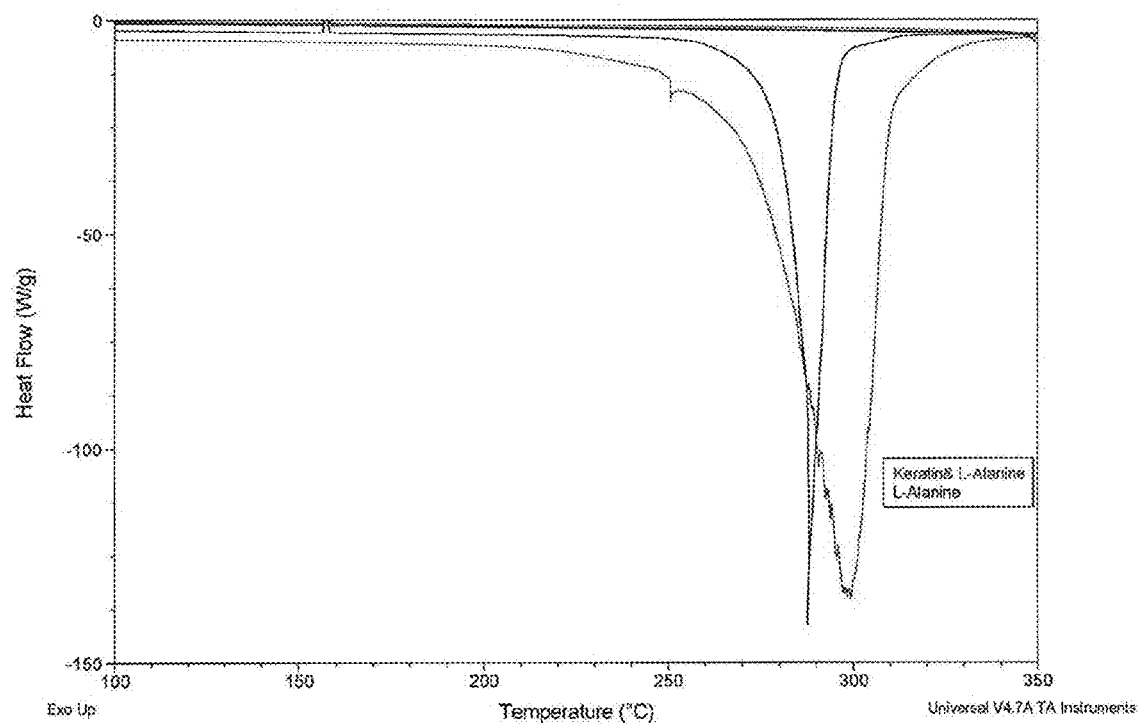
FIG. 2 shows the differential scanning calorimetry analysis of L-alanine only and a mixture of feather keratin and L-alanine.
Figure 3:
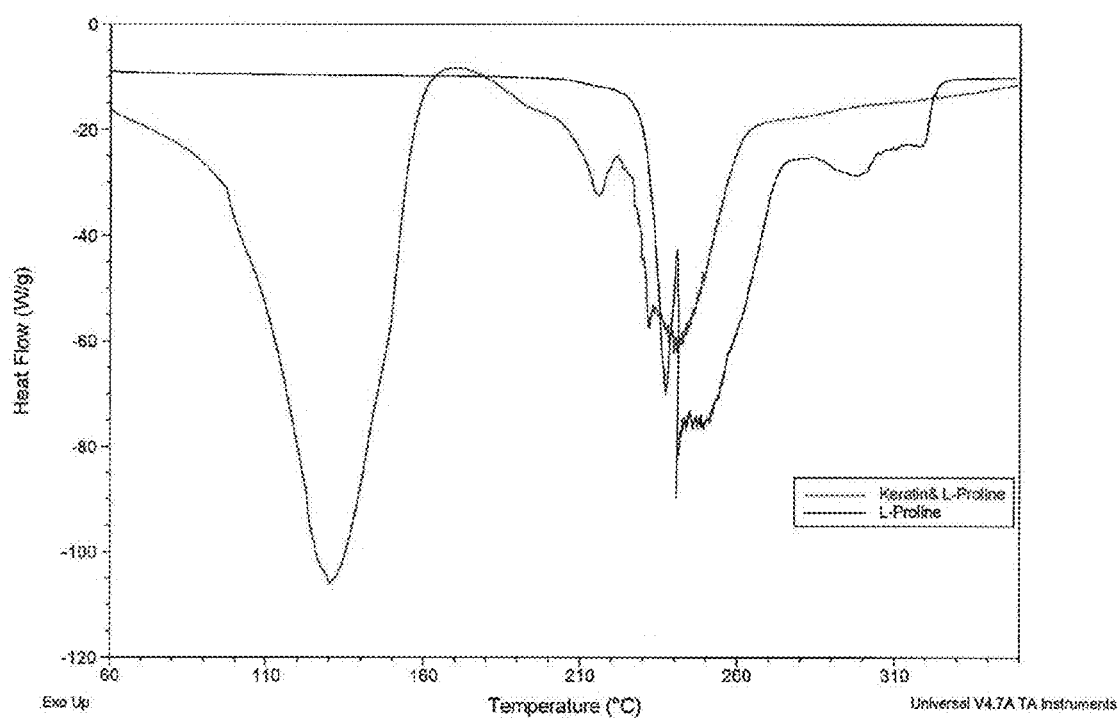
FIG. 3 shows the differential scanning calorimetry analysis of L-proline only and a mixture of feather keratin and L-proline.
Figure 4:
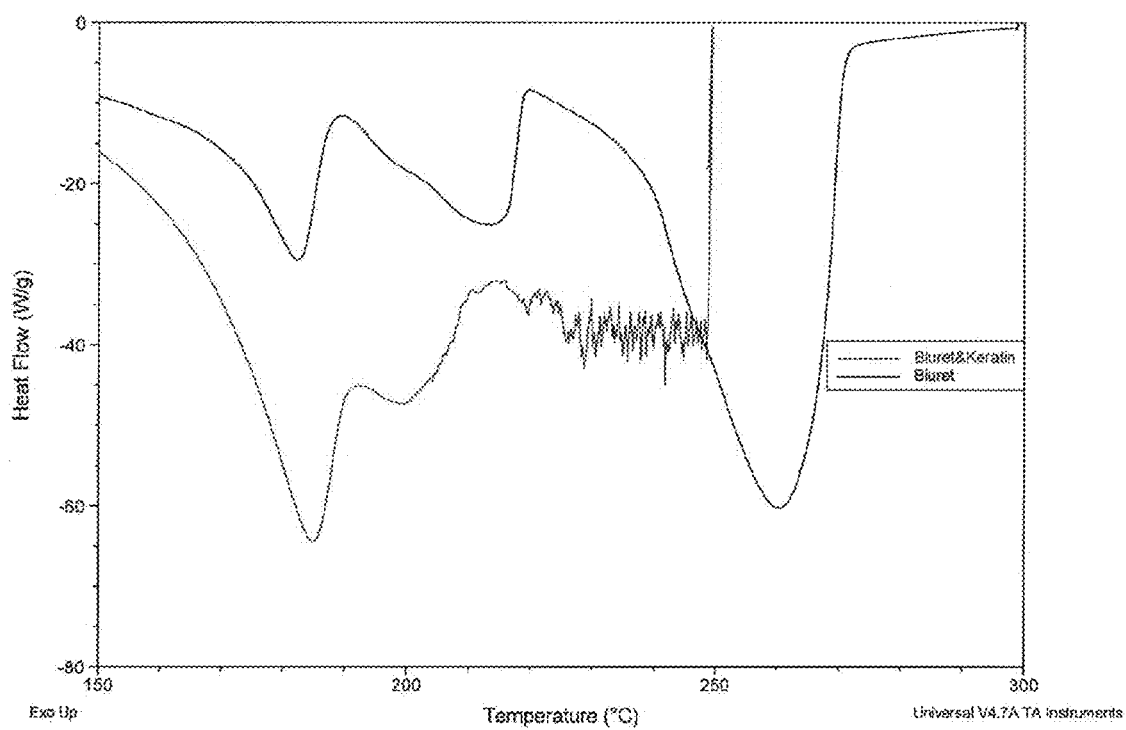
FIG. 4 shows the differential scanning calorimetry analysis of biuret only and a mixture of feather keratin and biuret.
Figure 5:
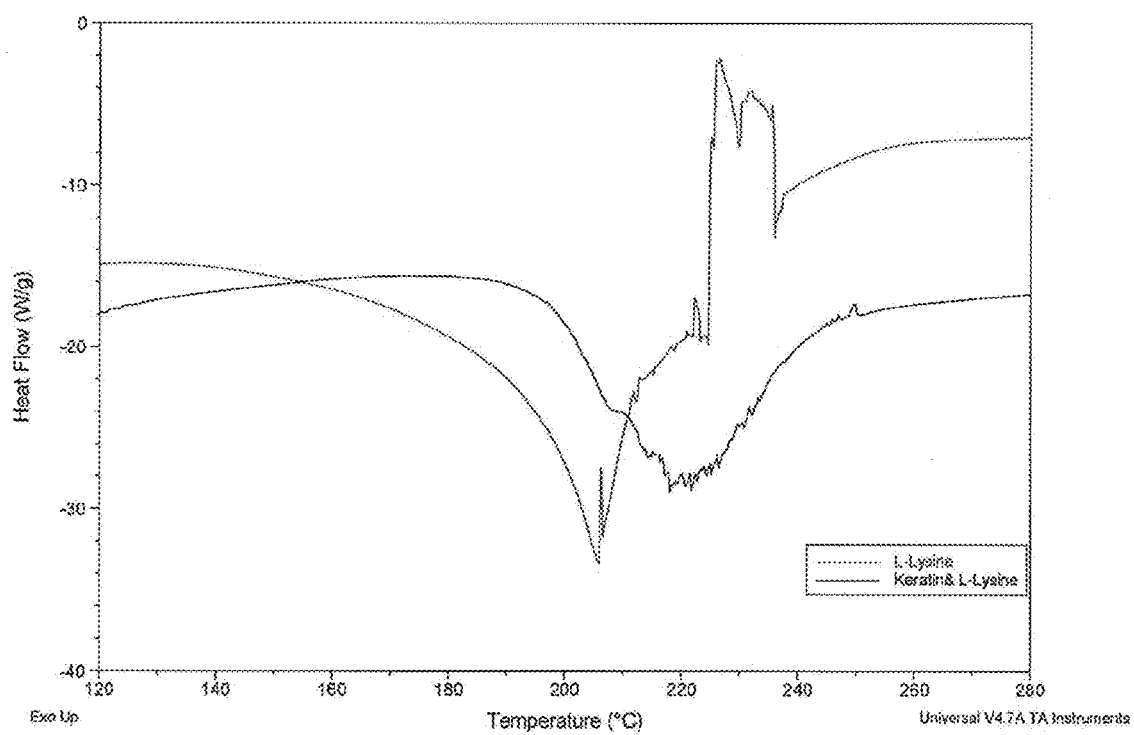
FIG. 5 shows the differential scanning calorimetry analysis of L-lysine only and a mixture of feather keratin and L-lysine.
Figure 6:
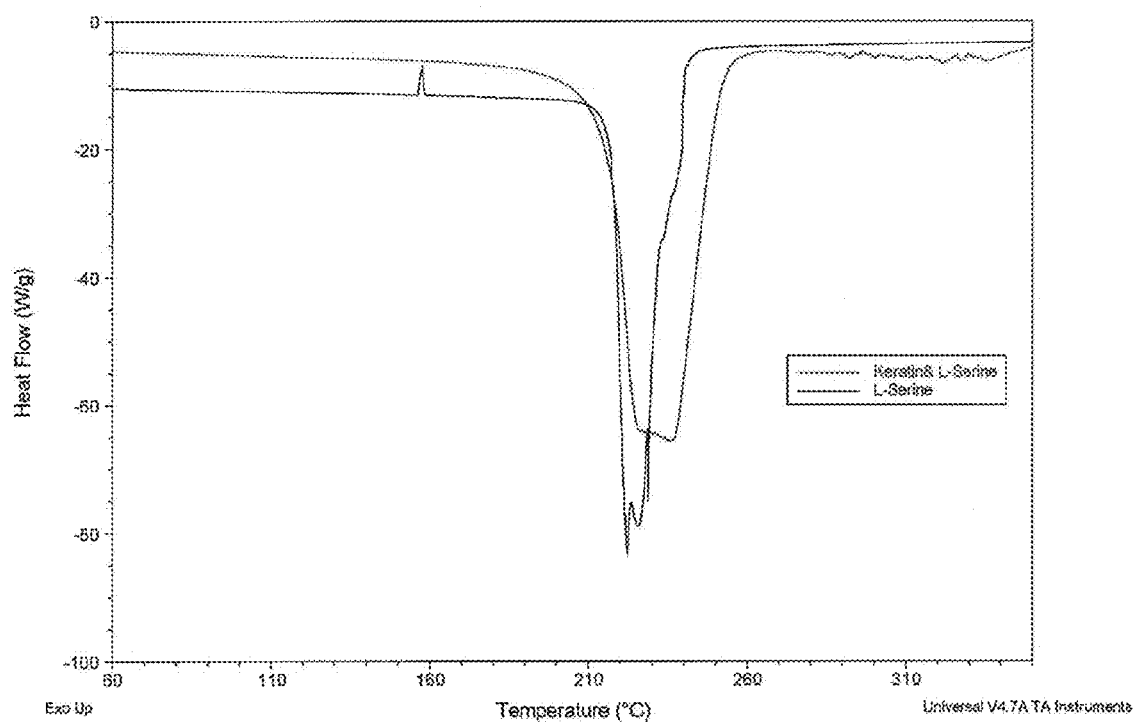
FIG. 6 shows the differential scanning calorimetry analysis of L-serine only and a mixture of feather keratin and L-serine.
Figure 7:
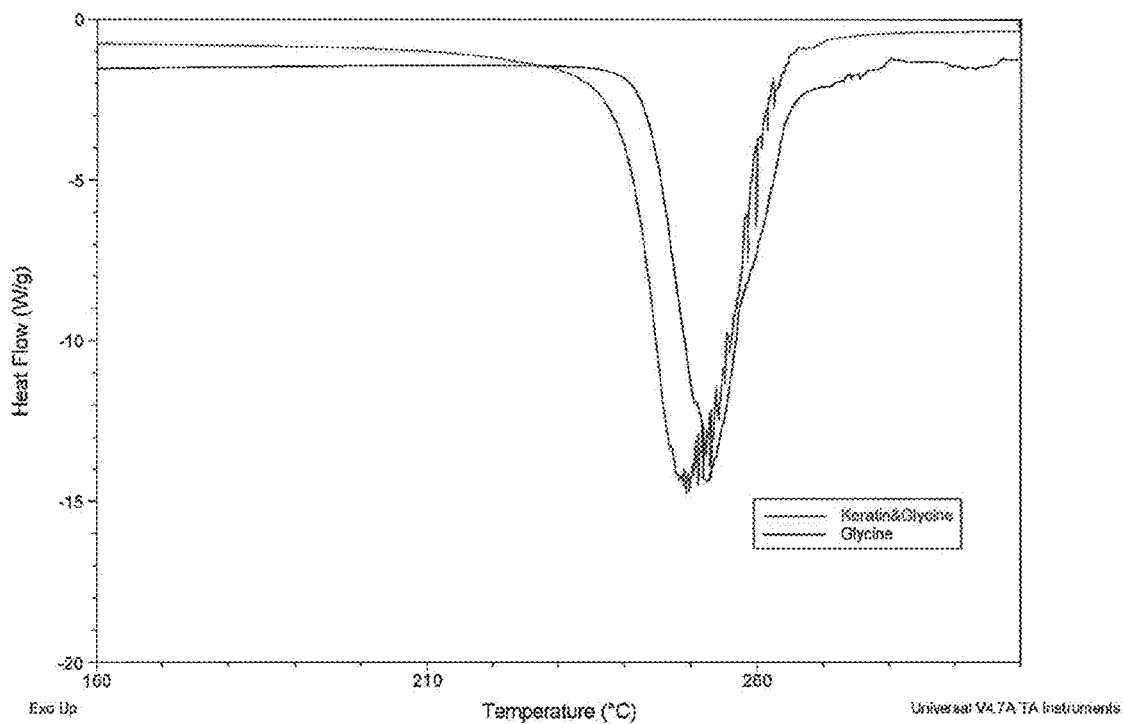
FIG. 7 shows the differential scanning calorimetry analysis of glycine only and a mixture of feather keratin and glycine.
Figure 8:
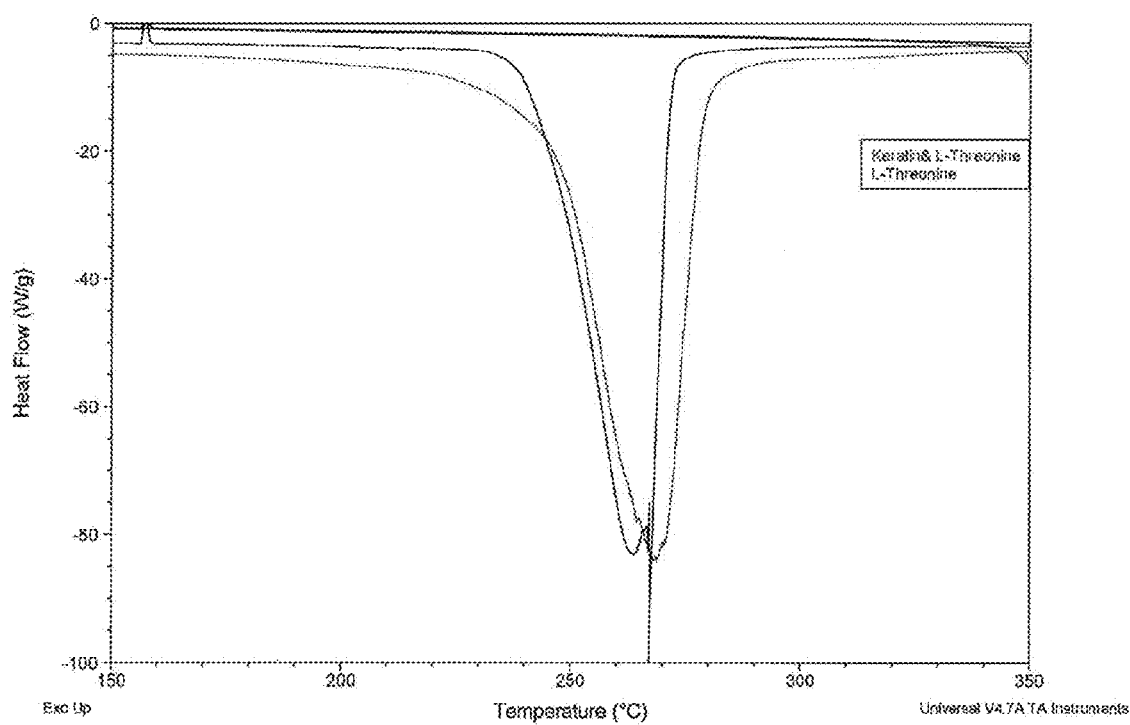
FIG. 8 shows the differential scanning calorimetry analysis of L-threonine only and a mixture of feather keratin and L-threonine.

FIG. 2 shows two plots produced using DSC of heat flow versus temperature for L-alanine (plasticizer) only and a mixture of 90% L-alanine (plasticizer) and 10% feather keratin wt/wt (the feather keratin contains 50% feather quill and 50% feather fiber particles wt/wt). 1-2 mg of sample is used per each DSC run. The keratin is powdered in a ball mill (Retsch, Model PM400, Haan, Germany) to about 100 nm prior to performing the DSC. The lysine (and all other amino acids used in the examples) is chemical grade 99+% and is obtained from Sigma-Aldrich, St. Louis, Mo. In this DSC assay, the temperature is increased at a rate of 5° C. every minute. For the alanine only plot, L-alanine starts to absorb heat energy at approximately 260° C., its inflection point (see FIG. 2, at "Point A"). Pure L-alanine's inflection point is a constant. DSC reveals a sharp peak for heat flow for L-alanine, and the slope of this peak is a function of the temperature rate. The slope for this peak for heat flow can be made to appear steeper if the rate of heating is lowered to 1° C. per second or broader (less steep) if the rate of heating is increased above 5° C. per second. Because the slope of this peak varies depending on the change in temperature rate and the particle size, the slope of this peak is a "process constant" and therefore process dependent. Yet, because the particle size in this example is very small and uniform, the particle size does not impact the slope of the peak in this example. This peak on the L-alanine plot revealed by DSC (FIG. 2) indicates that L-alanine undergoes substantial softening over the temperatures ranging from approximately 260° C. to approximately 295° C.

For the mixture of 90% L-alanine (plasticizer) and 10% feather keratin (containing 50% feather quill and 50% feather fiber particles wt/wt) wt/wt in FIG. 2, the heat flow plot has a maximum inflection point of approximately 220° C. (see FIG. 2, Point B), the temperature at which this mixture of L-alanine and feather keratin begins to absorb heat energy. This inflection point is at approximately the same temperature as the inflection point for feather keratin (see FIG. 1). However, this mixture of L-alanine and feather keratin continues to absorb heat energy over a wider temperature than feather keratin only. This increased range of heat energy absorption is caused by the addition of L-alanine (the plasticizer). Not wishing to be bound to any particular hypothesis, it appears that at approximately 260° C., the L-alanine begins to transfer the heat flow energy to the feather keratin, especially to the regions of the biopolymer containing alanine. As the temperature increases, additional heat flow energy is absorbed by other amino acids in the keratin, thereby disrupting the crystalline structure of the keratin and allowing the keratin to soften. The keratin significantly softens between approximately 260° C. and approximately 320° C. The maximum heat energy absorption of this mixture occurs at approximately 295° C. (see FIG. 2, Point D). Based on this heat flow absorption information in FIG. 2, this mixture of L-alanine and feather keratine is capable of relatively problem-free extrusion at temperatures between approximately 260° C. and approximately 320° C., yet one may want to use a temperature below approximately 300° C., the temperature at which feather keratin decomposes. It is noted that normally DSC curves are generated using low levels of plasticizer with higher levels of biopolymers. However, because the peptide-based biopolymer used in these examples (keratin) can have 100 molecular sites at which plasticization could occur versus each plasticizer molecule, lower levels in the peptide-based biopolymer (i.e., 10% biopolymer+90% plasticizer wt/wt) are required to assure only the most active, easily plasticized sites are detected.

Figure 9:
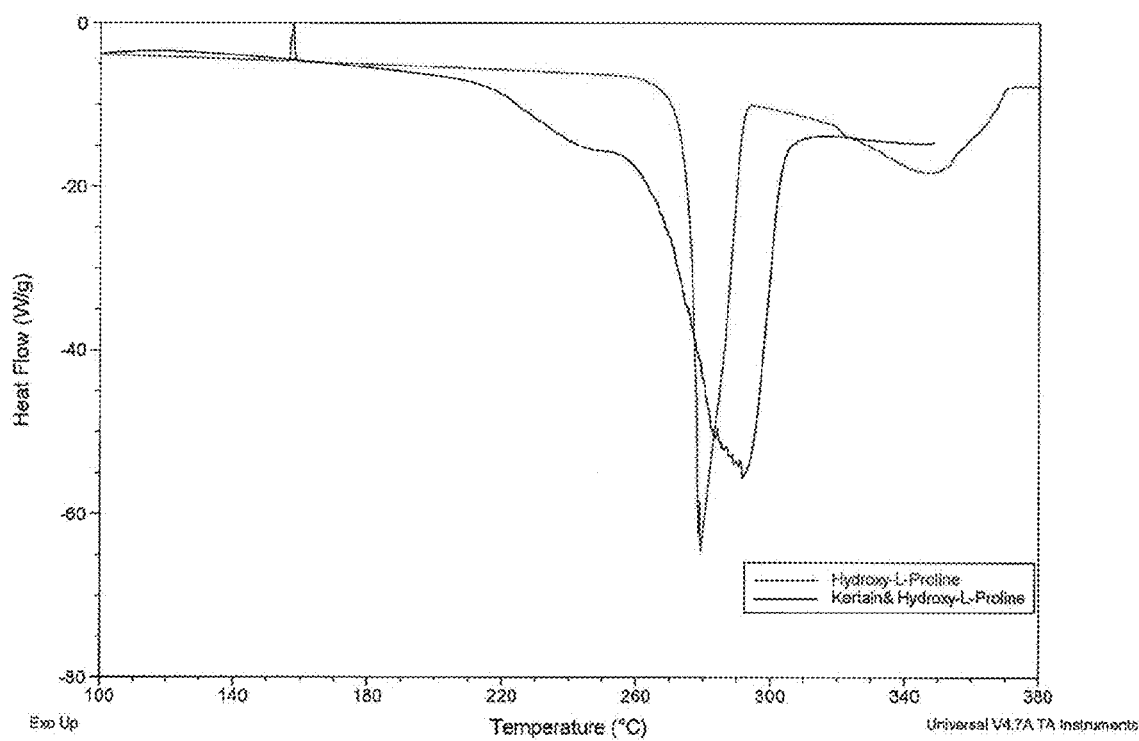
FIG. 9 shows the differential scanning calorimetry analysis of hydroxy-L-proline only and a mixture of feather keratin and hydroxy-L-proline.

To assess the impact of other nitrogen-containing plasticizers on the feather keratin's ability to absorb heat energy and softening of the keratin, the following nitrogen-containing compound were used as plasticizers and mixed individually with feather keratin in a 10%/90% wt/wt basis, where the feather keratin contains 50% feather quill and 50% feather fibers wt/wt: proline (FIG. 3), biuret (FIG. 4), lysine (FIG. 5), serine (FIG. 6), glycine (FIG. 7), threonine (FIG. 8), and hydroxyl-L-proline (FIG. 9). Prior to performing the DSC analysis the keratin is powdered in a ball mill (Retsch, Model PM400, Haan, Germany) to about 100 nm. 1-2 mg of sample is used per each DSC run. Each of FIGS. 3-10 illustrate the heat flow of the nitrogen-containing compound plasticizer by itself and the mixture of the nitrogen-containing compound and the keratin.

Of these plasticizers, proline, biuret, lysine, and serine impart to the feather keratin significant heat energy absorption at a lower temperature than occurs when using glycine, threonine, hydroxyl-L-proline, or L-alanine as the plasticizer. Yet, each of these nitrogen-containing compounds imparts softening to feather keratin at lower temperature ranges than pure feather keratin does. Thus, these nitrogen-containing compounds are plasticizers for feather keratin and other peptide-based biopolymers.

When using proline as a plasticizer with feather keratin, the feather keratin has energy absorption and softening below 150° C., permitting easy extrusion of a 50% proline 50% feather keratin (wt/wt) mixture at approximately 130° C. which is the "average" value for the melting curve based on DSC assay and which is significantly lower than proline's $T_m$ (228° C.) and feather keratin's decomposition temperature (300° C.). Mixtures of 50% biuret and 50% feather keratin (wt/wt) have significant softening of the mixture at less than 190° C. Thus, one can extrude this mixture of 50% biuret and 50% feather keratin (wt/wt) at approximately 185° C., again lower than biuret's $T_m$ (193° C.) and feather keratin's decomposition temperature. Mixtures of 50% lysine and 50% feather keratin (wt/wt) have significant softening of the mixture below 220° C. One can extrude this mixture of 50% lysine and 50% feather keratin (wt/wt) at approximately 200° C., again lower than lysine's $T_m$ (215° C.) and feather keratin's decomposition temperature. Mixtures of 50% serine and 50% feather keratin (wt/wt) have significant softening of the mixture at less than 220° C. One can extrude this mixture of 50% serine and 50% feather keratin (wt/wt) at approximately 200° C., again lower than serine's $T_m$ (222° C.) and feather keratin's decomposition temperature.

EXAMPLE 3

Proline Feather Powder Pellets

Feathers, containing keratin, are ground in a ball mill (Retsch, Model PM400, Haan, Germany) for a sufficient time to achieve a particle size of approximately 200 microns or less. The feather keratin powder is an approximately 50%:50% mixture wt/wt of α and β configuration of the feather keratin (approximately 50% feather quill and 50% feather fiber, wt/wt). Next, 100 grams of proline (Sigma-Aldrich, St. Louis, Mo.) (a plasticizer) are mixed with 900 grams of feather keratin powder (size—approximately 200 micron or less) (10% proline/90% feather keratin wt/wt). The proline and feather keratin powder are mixed in a blender (Hobart Corp., Troy, Ohio) for approximately 10 minutes at ambient temperature until the proline (the plasticizer) is fully dispersed throughout the feather powder.

The extruder (Randcastle Extrusion, TM-1000, Cedar Grove, N.J.) is heated to approximately 130° C., the average value for the melting curve of proline/feather keratin mixture as determined by DSC in Example 2 above. The mixture of 10% proline and 90% feather keratin powder (wt/wt) is added to the extruder. Standard pellets are extruded. The peptide-based biopolymer, nitrogen-containing compound plasticizer mixture are extruded as a one mm outer diameter fiber at about 2 cm/sec. Pellets are 1 mm outer diameter by 3 mm length. For the 10% proline/90% feather keratin powder (wt/wt) mixture, the temperature should be sufficient to soften, but not melt the plasticizer (e.g., below 160° C.) determined by the DSC assay in Example 2.

EXAMPLE 4

Pellets Containing Biuret and Keratin

Pellets containing keratin and biuret (Sigma Aldrich, St. Louis, Mo.) at different percentage ratios on wt/wt basis are made. A ¾ inch single-screw extruder (Brabender, GmbH & Co., South Hackensack, N.J.) is used. Temperature zones B and C are maintained at 183° C. and 155° C., respectively. The plastic strands are chopped using a pelletizer (Bay Plastics Machinery, Bay City, Mich.). Feathers, containing keratin, are ground in a ball mill (Retsch, Model PM400, Haan, Germany) for a sufficient time to achieve the below indicated particle size prior to mixing with biuret. The DSC curves are performed on 1-2 mg of the resulting pellets. Sample 1 contains 70% keratin powdered and 30% biuret wt/wt. Sample 2 contains 70% keratin finely ground and 30% biuret wt/wt. Sample 3 contains 50% keratin powdered and 50% biuret wt/wt. Sample 4 contains 50% keratin finely ground and 50% biuret wt/wt. Sample 5 contains 40% keratin powdered and 60% biuret wt/wt.

Figure 10:
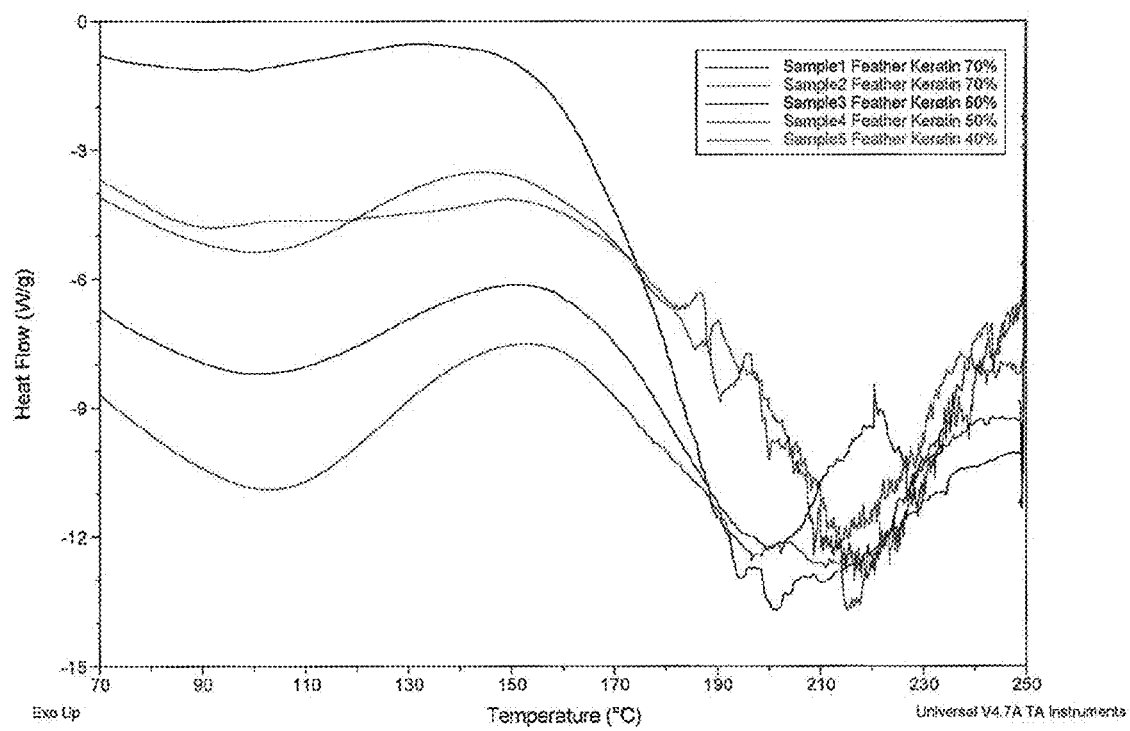
FIG. 10 shows the differential scanning calorimetry analysis of mixtures of different ratios of feather keratin and biuret.

FIG. 10, the DSC curves demonstrate that keratin can be softened and extruded in the presence of biuret even at 170° C., which is about 30-35° C. lower than its melting point. The peaks at about 105° C. indicate ball mill powdered keratin has less moisture than centrifugal ground keratin. Powdered keratin is not required for extrusion processing. Smoothness in curve after 210° C. indicates an extended range of extrusion processability and thermal stability. Biuret softens the surface of keratin microscopic structures such that they can flow smoothly through the extruder. Not wishing to be bound to any particular hypothesis, increased "noisiness" in the DSC at 50% or lower keratin above 180° C. suggests biuret is beginning to soften deeper into some of keratin morphological or molecular structures. An alternative hypothesis is that biuret and keratin binding is less uniform because biuret has an additional phase transition above 180° C.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. All documents cited herein are incorporated by reference.

Recitation of ranges of values herein are merely intended to serve as a shorthand method of referring individually to each separate value falling within the range, unless otherwise indicated herein, and each separate value is incorporated into the specification as if it is individually recited herein. For example, if the range 10-15 is disclosed, then 11, 12, 13, and 14 are also disclosed. All numeric values provided herein include a 10% increase and a 10% decrease of that value. So, "ten" includes all numbers between "nine" and "eleven"; "one hundred" includes all numbers between "ninety" and "one-hundred ten". "Approximately ten" includes all numbers between "nine" and "eleven". As used in the specification and claims, the singular form "a", "an" and "the" include plural references unless the context clearly dictates otherwise.

I, the inventor, claim as follows:

1. A method of reducing the melting point of a peptide-based biopolymer comprising mixing said peptide-based biopolymer with a nitrogen-containing plasticizing compound to form a mixture of said peptide-based biopolymer and said nitrogen-containing plasticizing compound, and heating said mixture of said peptide-based biopolymer and said nitrogen-containing plasticizing compound; wherein said nitrogen-containing plasticizing compound's melting point is greater than the melting point of urea, wherein said nitrogen-containing plasticizing compound's melting point differs from said peptide-based biopolymer's melting point, and wherein said peptide-based biopolymer's melting point is reduced after mixing said nitrogen-containing plasticizing agent with said peptide-based biopolymer.

2. The method of claim 1 wherein said peptide-based biopolymer is keratin or silk.

3. The method of claim 1 wherein said nitrogen-containing plasticizing compound is selected from the group consisting of an amino acid, biuret, melamine and a combination thereof.

4. The method of claim 3, wherein said peptide-based biopolymer is keratin, and wherein said amino acid is selected from the group consisting of proline, lysine, serine, glycine, and combinations thereof.

5. The method of claim 3 wherein said peptide-based biopolymer is keratin and wherein said nitrogen-containing plasticizing compound is selected from the group consisting of biuret, melamine, proline, lysine, serine, glycine, and combinations thereof.

6. The method of claim 1 wherein the ratio of the weight of said peptide-based biopolymer to the weight of said nitrogen-containing plasticizing compound ranges between approximately 1/99 to approximately 15/85.

7. The method of claim 6 wherein said ratio is approximately 10/90.

8. The method of claim 1, wherein said mixture of said peptide-based biopolymer and said nitrogen-containing plasticizing compound has a phase transition temperature of between approximately 130° C. and less than 300° C.

9. A method of producing an extrusion pellet of peptide-based biopolymer comprising
   (a) combining said peptide-based biopolymer with a nitrogen-containing plasticizing compound to form a mixture of said peptide-based biopolymer and said nitrogen-containing plasticizing compound, wherein said peptide-based biopolymer's melting point is reduced after mixing said nitrogen-containing plasticizing agent with said peptide-based biopolymer;
   (b) heating said mixture of said peptide-based biopolymer and said nitrogen-containing plasticizing compound to said mixture's phase transition temperature to form an extrudable mixture of a softened peptide-based biopolymer and said nitrogen-containing plasticizing compound, wherein said mixture's phase transition temperature is less than said peptide-based biopolymer's melting temperature, and wherein said mixture's phase transition temperature is between approximately 130° C. and less than 300° C.; and
   (c) extruding a pellet of said mixture of said softened peptide-based biopolymer and said nitrogen-containing plasticizing compound, wherein said nitrogen-containing plasticizing compound is not urea.

10. The method of claim 9 wherein said peptide-based biopolymer is keratin, silk, or a combination thereof.

11. The method of claim 9 wherein said nitrogen-containing plasticizing compound is selected from the group consisting of an amino acid, biuret, melamine, or a combination thereof.

12. The method of claim 9 wherein said peptide-based biopolymer is keratin and wherein said nitrogen-containing plasticizing compound is selected from the group consisting of biuret, melamine, proline, lysine, glycine, serine, or a combination thereof.

13. The method of claim 12, wherein a ratio of the weight of said peptide-based biopolymer to the weight of said nitrogen-containing plasticizing compound ranges from approximately 1/99 to approximately 15/85.

14. The method of claim 13, wherein said ratio of the weight of said peptide-based biopolymer to the weight of said nitrogen-containing plasticizing compound is approximately 10/90.

15. The method of claim 9 wherein a melting point of said mixture of said peptide-based biopolymer and said nitrogen-containing plasticizing compound ranges from approximately 130° C. to approximately 295° C.

16. The method of claim 9 wherein a melting point of said nitrogen-containing plasticizing compound is greater than 132° C.

\* \* \* \* \*